Nov. 1, 1938.          D. E. REED          2,135,145
MIRROR DEVICE
Filed June 19, 1937
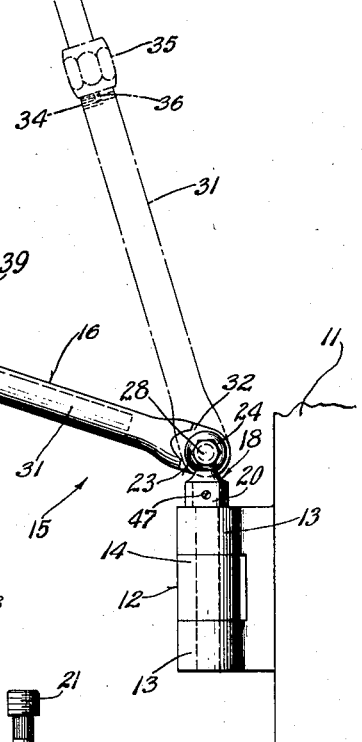
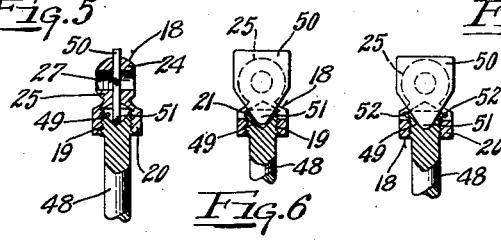
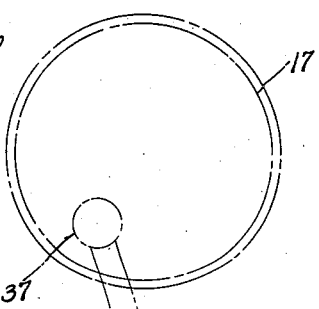
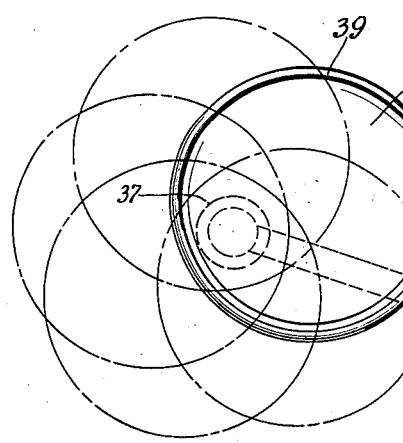
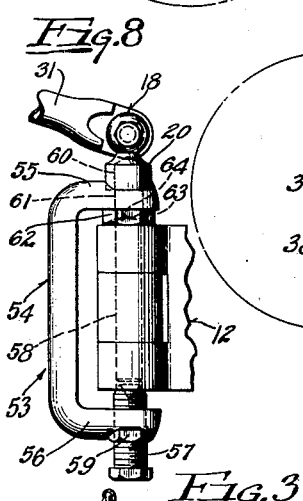
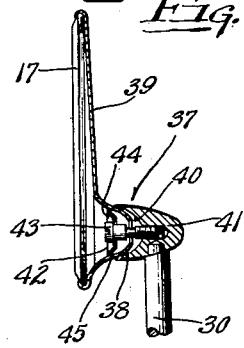
INVENTOR
DANIEL E. REED
BY William F. Weyrer
ATTORNEY Patented Nov. 1, 1938

2,135,145

UNITED STATES PATENT OFFICE 2,135,145

MIRROR DEVICE

Daniel E. Reed, Norwalk, Conn., assignor to Yankee Metal Products Corp., Norwalk, Conn., a corporation of New York Application June 19, 1937, Serial No. 149,049

7 Claims. (Cl. 248—286)

My invention relates to a mirror device, and more particularly to means for mounting a rear view mirror on a vehicle.

It is an object of the invention to provide a mirror device which may be readily associated with a hinge of a vehicle door.

Heretofore it has been proposed to associate rear view mirrors with vehicle doors. However, most of these previous proposals included a special C type clamp with a screw, which had the disadvantage sometimes of being loosened by vibration, and falling from the car.

It is an object of the present invention to provide a mounting whereby the mirror may be associated with the door in a most simple manner and may be more positively secured in association with the door and effectively adjusted to divers positions than with mountings heretofore developed.

In achieving these objects there is provided as a feature of the invention a mirror device in which the mirror may be raised and lowered and also moved inwardly and outwardly relative to the vehicle door, thus enabling a proper positioning of the mirror to divers eye heights and enabling adjustment of the mirror to reflect the desired area at the rear of the vehicle.

A further feature of the invention resides in providing a mirror device with a hinge pin pivotally connected to the mirror support, whereby the mirror may be readily associated with the vehicle door hinge by merely substituting the hinge pin of the present mirror device for the regular hinge pintle, and when so associated the mirror may be raised and lowered and otherwise positioned relative to the vehicle door.

Another feature of the invention resides in providing a means on the mirror support enabling the association therewith of hinge pins of various sizes so that the manufacturer need make only one mirror and support and provide two, three or four simple pins to insure that the same mirror device may be readily used with many vehicles of different manufacture.

Another feature of the invention resides in providing a mirror device for association with a vehicle door hinge in which the support is extensible and in which the support is associated with the mirror by a substantially universal pivotal connection, located eccentrically of the mirror, whereby the mirror may be adjusted in divers positions relative to the support.

Other objects and features will hereinafter appear.

In the drawing:

Figure 1 is a side view of the mirror device in operative association with a vehicle door hinge, the device being disclosed in divers adjusted positions.

Fig. 2 is a detail view showing the mirror in a number of the adjusted positions made possible by the eccentric pivotal mounting of the mirror on the support.

Fig. 3 is a sectional view showing the universal pivotal connection between the mirror and the support.

Fig. 4 is an exploded detail view showing several hinge pins of different sizes and the cap by means of which the mirror support may be pivotally connected to any one of the pins.

Figs. 5, 6 and 7 are detail views showing a modified hinge pin construction.

Fig. 8 is a detail view showing a modified clamping means for associating the mirror device with a vehicle door hinge.

Before describing the present improvements and mode of operation thereof in detail it should be understood that the invention is not limited to the details of construction and arrangement of parts shown in the accompanying drawing, which is merely illustrative of the present preferred embodiments, since the invention is capable of other embodiments, and the phraseology employed is for the purpose of description and not of limitation.

Referring more particularly to the drawing there is disclosed a portion of a conventional vehicle door 11 with which a hinge 12 is associated to pivotally connect the door to the door post, not shown. As is likewise conventional, the hinge 12 includes a pair of spaced ears 13 fixed to and movable with the door, and an ear 14 fixed to the door post.

Now of particular importance the mirror device 15 constituting the subject matter of the present invention includes a novel mounting 16 by means of which it may be readily associated with the door hinge 12 in such a way that the mirror 17 may be raised and lowered, moved to divers angular positions and also moved inwardly and outwardly relative to the vehicle door thus enabling an adjustment of the mirror to be in proper position for the eyes of a particular occupant of a vehicle whether that occupant be tall or short. Such adjustments are of considerable importance because proper rear vision is necessary to enable the operator of the vehicle to be acquainted at all times with any moving objects that may be present at the rear and/or to the side of his own vehicle.

This novel mounting 16 which may thus be advantageously associated with the vehicle comprises a cap 18 having a threaded bore 19 in a base section 20 thereof adapted to receive a threaded head or screw portion 21 on the upper end of a pin 22 adapted to be inserted in the hinge 12 in place of the regular hinge pintle.

A bifurcated portion 23 on the cap 18 provides a pair of upstanding ears 24 and 25 having respectively a bore 26 and a threaded bore 27 for the receipt of a screw 28 which serves as a horizontal pivot connection between the pin 22 and an extensible support or arm 29 for the mirror.

Preferably, and as shown, the support 29 consists of two telescopically associated members 30 and 31, the member 31 being tubular and having a pinched portion 32 at one end thereof adapted to be inserted between the ears 24 and 25 of the cap to receive the pivot screw 28. A lock washer 33 may advantageously be inserted on the screw 28 to prevent loosening thereof.

At the other end of the member 31 a threaded portion 34 is provided to receive a clamping nut 35 with a tapered bore. Longitudinal slots 36 in the threaded portion 34 permit the member 31 to be drawn in and firmly clamped to the associated telescoping member 30 when the nut 35 is tightened. In this manner, by merely tightening and untightening the clamping nut 35 the slidable member 30 and associated mirror 17 may be moved inwardly and outwardly, and may be locked in any desired position. Likewise the mirror 17 may be rotated on the longitudinal axis of the support 29 by merely turning the member 30 in the tubular member 31.

For associating the mirror 17 with the member 30 of the extensible support 29 an advantageous substantially universal pivot connection 37 is utilized. Of importance, it is to be noted that the connection 37 is located eccentrically at the rear of the mirror. Hence, it is possible, as shown in Fig. 2, to adjust the mirror to divers positions relative to the support and thus cover a wider field of vision than would otherwise be possible.

This advantageous universal connection 37, see Fig. 3, is achieved by forming an outwardly extending bulb portion 38 on the mirror casing 39, adapted to fit in a mating socket 40 in a head 41 on the free end of the slidable member 30. A yielding retaining washer 42 positioned on the inside of the bulb portion 38 and connected to the head 41 by a screw 43 serves to maintain the mirror 17 and the head 41 in universal relation. As shown, the peripheral portion 44 of the washer 42 is advantageously curved to correspond with the curvature of the bulb portion 38 and is formed with radial slots 45 to facilitate the rocking and rotating movement between the head and the mirror casing 39.

It is thus seen that when the novel mirror device 15 is associated with the door hinge the mirror may be swung upwardly and downwardly on the horizontal pivot provided by the screw 28, as shown in Fig. 1 in full and dotted lines. Likewise it is seen that by adjusting the extensible support 29 the mirror may be moved inwardly and outwardly as well as upwardly and downwardly relative to the vehicle door. The lateral and pivotal adjustment of the mirror 17 on the support and the pivotal adjustment of the member 30 in the tubular member, together with the adjustments above reviewed result in a completely universal mounting for the mirror.

In order that the mirror may swing inwardly and outwardly with the door, a portion 46 of the pin 22 is corrugated so that the pin engages in a firmer contact with the movable ear 13 of the hinge than with the fixed ear 14. This is advantageous in that the mirror device is not only firmly secured in place but is automatically movable with the door so as not to interfere with the normal movement thereof. If desired, a set screw 47 may be provided to lock the pin to the cap and thus insure against the mirror device being jarred loose from its mounting. Also, if preferred the cap may be made integral with the pin.

It is to be especially noted, however, that because of the advantageous disclosed construction of the cap 18 and the pin 22 it is possible to readily adapt the mirror device 15 for association with hinges of various sizes as found in vehicles of different manufacture. For example, assume that the door hinge of the vehicle with which it is desired to associate the mirror device 15 requires a hinge pintle the size of the pin 22 at the left in Fig. 4. It is then merely necessary to screw the threaded head portion 21 of the pin in the cap, knock out the regular hinge pintle and insert in its place the pin of the mirror device. If the hinge requires a smaller pintle, of a size corresponding to one of the two smaller pins 22a and 22b at the right in Fig. 4, then it is merely necessary to screw the pin of the proper size in the same cap 18. This interchangeable feature is made possible by forming all of the pins 22, 22a and 22b with a threaded head portion 21 of the same size.

Inasmuch as the door hinges of practically all automobiles, the vehicles with which the rear view mirror device 15 was especially designed for use, fall within a very limited number of standard sizes, a supply of three sizes of pins as shown is sufficient to render the device 15 readily adaptable for use with substantially any automobile of standard manufacture on the market today. While pins of three sizes are illustrated it will be appreciated that either a larger or a smaller number of pins may be supplied by the manufacturer of the mirror device 15.

With the mirror device 15, therefore, it is possible for the manufacturer to make all the parts of the mirror mounting 16 of the same size with the exception of the hinge pins. This results in a considerable manufacturing economy and lessens the amount of stock which a distributor must carry.

If desired, as shown in Figs. 5, 6 and 7, a slightly modified hinge pin 48 may be utilized. The modified hinge pin 48 differs from the pin 22 first described in the provision of a socket 49 in the upper end thereof. Because of this socket 49 it is possible to advantageously lock the cap 18 to the pin after the latter has been screwed therein, as when the hinge pin is inserted in the door hinge 12.

Thus, with the modified construction when it is desired to associate the mirror device 15 with a hinge, a hinge pin of the proper size is first screwed into the cap 18. The pin 48 is then inserted in the upper hinge ear 13, and a wedge 50 placed between the cap ears 24 and 25 with the apex 51 thereof in the pin socket 49.

The wedge 50 may then be hammered to drive the pin 48 through the hinge. The use of the wedge therefore, is seen to be advantageous in that it prevents disfiguring or breaking the cap ears during the inserting operation.

Moreover, and of particular importance, the wedge 50 engaging in the pin socket 49 during the hammering operation peens and spreads the upper end of the pin 48 to form stop keys 52, see Fig. 7, which extends between the cap ears 24 and 25 and over the cap base 20 to thereby effectively lock the cap 18 and pin 48 together. With the modified pin, therefore, it is not necessary to use the locking set screw 47 to prevent relative turning of the cap and pin.

Instead of utilizing the special pins 22 or 48 as means for associating the mirror device 15 with the door hinge 12 a clamping means 53, see Fig. 8, may be employed. With this means the same completely universal mounting of the mirror is achieved as in the construction first described.

This clamping means 53 includes a C clamp 54 having, as is conventional, an upper arm 55 and a lower arm 56 adapted to receive the door hinge 12 therebetween. As is also conventional a clamping screw 57 is provided in screw threaded relation with the lower arm 56, and which extends upwardly to engage with the lower end of the standard hinge pintle 58. A lock nut 59 may be provided on the clamping screw 57 to prevent inadvertent loosening thereof.

Of particular importance, however, it is to be noted that a connecting screw 60 is inserted in a bore 61 in the upper clamp arm 55 to extend upwardly into the threaded bore 19 of the cap 18. A head 62 on the screw 60 and underlying the upper arm 55, is formed with a concavity or socket 63 therein adapted to receive the hinge pintle head 64 to thus firmly maintain the clamp 54 in association with the hinge 12 when the clamping screw 57 is tightened. This advantageous clamping means 53 by which the mirror device 15 may be associated with a vehicle door hinge is thus seen to be interchangeable in the mirror mounting 16 with the special hinge pins 22 or 48.

Other variations and modifications may be made within the scope of this invention and portions of the improvements may be used without others.

Having thus described the invention what is claimed as new is:

1. In a mounting for attachment to a vehicle door hinge, the combination of a supporting arm for a mirror or the like; a cap having a base with a threaded bore, adapted to interchangeably receive hinge pintles of divers sizes formed with threaded portions at the upper end thereof of uniform size; an ear on said cap, extending from said base; and pivot means for connecting said ear to said supporting arm.

2. In a mounting for attachment to a vehicle door hinge, the combination of an extensible supporting arm for a mirror or the like, said supporting arm comprising a pair of telescopically associated members one of which is formed with a longitudinal slot and screw threads at one end thereof; a clamping nut on said threaded end for clamping said telescoping members relative to each other in divers adjusted positions; a pin adapted to serve as the pintle for the hinge of a vehicle door, having a threaded portion at one end; means on said pin for locking the latter to the movable part of the hinge; a cap having a base with a threaded bore for receiving said threaded portion; and a horizontal pivotal connection between said cap and said supporting arm whereby the supporting arm may be raised and lowered relative thereto.

3. In a mounting for attachment to a vehicle door hinge, the combination of a supporting arm for a mirror or the like; a cap having a base with a threaded bore; a pair of spaced ears on said cap, extending from said bore; means connecting said supporting arm to said cap between said ears; a screw adapted to be associated with said hinge, having a socket in the upper end and extending up into said bore; at least one projection on said upper end extending between said ears and overlying said base; and means for connecting said screw to said hinge.

4. In a mounting for attachment to a vehicle door hinge, the combination of a supporting arm for a mirror or the like; a cap having a base with a threaded bore therein; an ear on said cap; a horizontal pivot connection between said supporting arm and said ear; a C clamp adapted to be secured to the hinge; and a screw on said clamp, having a threaded portion extending into said threaded bore and having a head with a socket therein adapted to receive an end of the hinge pin.

5. In a mounting for attachment to a vehicle door hinge, the combination of a supporting arm for a mirror; a cap having a base with a threaded bore; an ear on said cap; means for pivotally connecting said supporting arm and said ear; a screw extending up into said threaded bore; and means for connecting said screw to the door hinge.

6. In a mounting for attachment to a vehicle door hinge, the combination of a supporting arm for a mirror; a cap having a base with a threaded bore; a pair of spaced ears on said cap, extending upwardly from said bore; means between said ears for connecting said supporting arm to said cap; a pin adapted to serve as the pintle for said hinge; a threaded head on said pin, having a socket in the upper end and insertable in said bore, whereby a wedge may be inserted between said ears and in said socket to spread the head and lock the latter to the cap.

7. In a mounting for attachment to a vehicle door hinge, the combination of a pin adapted to serve as a pintle for the hinge of a vehicle door, having a threaded portion at one end thereof; a cap having a base with a threaded bore, for receiving said threaded portion; and a supporting arm for a mirror or the like, connected to and extending from said base.

DANIEL E. REED.